(12) United States Patent
Korobkov et al.

(10) Patent No.: US 8,024,051 B2
(45) Date of Patent: Sep. 20, 2011

(54) PARALLEL POWER GRID ANALYSIS

(75) Inventors: Alexander Korobkov, San Jose, CA (US); Wai Chung William Au, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 429 days.

(21) Appl. No.: 12/391,945

(22) Filed: Feb. 24, 2009

(65) Prior Publication Data

US 2010/0217577 A1 Aug. 26, 2010

(51) Int. Cl.
*G05B 11/01* (2006.01)
*G06G 7/54* (2006.01)
(52) U.S. Cl. .......................................... 700/22; 703/18
(58) Field of Classification Search .................. 700/22, 700/286; 703/18
See application file for complete search history.

(56) References Cited

U.S. PATENT DOCUMENTS

| | | | | |
|---|---|---|---|---|
| 5,317,525 | A * | 5/1994 | Taoka et al. ..................... | 703/18 |
| 7,484,195 | B1 * | 1/2009 | Korobkov ..................... | 716/113 |
| 2007/0157133 | A1 * | 7/2007 | Cheng et al. ..................... | 716/4 |
| 2008/0059922 | A1 * | 3/2008 | Korobkov ......................... | 716/4 |
| 2009/0319250 | A1 * | 12/2009 | Yu et al. .......................... | 703/14 |

OTHER PUBLICATIONS

Dharchoudhury, A., et al., Design and Analysis of Power Distribution Networks in PowerPC Microprocessors, 1998, pp. 738-743 (6 pages).
Bacher, R., et al., Approximate Sparse Vector Techniques for Power Network Solutions, IEEE Transactions on Power Systems, vol. 6, No. 1, Feb. 1991, pp. 420-428 (9 pages).
Chiprout, E., Fast Flip-chip Power Grid Analysis Via Locality and Grid Shells, 2004, pp. 485-488 (4 pages).
Klinger, V., DiPaCS: A New Concept for Parallel Circuit Simulation, 1995, pp. 32-41 (10 pages).
Wever, U. and Zheng, Q., Parallel Transient Analysis for Circuit Simulation, 1996, pp. 442-447 (6 pages).
Hachiya, K., et al., Enhancement of Parallelism for Tearing-based Circuit Simulation, 1997, pp. 493-498 (6 pages). Frohlich, N., et al., A New Approach for Parallel Simulation of VLSI Circuits on a Transistor Level, IEEE Transactions on Circuits and Systems, vol. 45, No. 6, Jun. 1998, pp. 601-613 (13 pages).
Golub, G. H. and Van Loan, C. F., Matrix Computations, Second Edition, 1989, cover page, pp. 137, 138, 141-146 (9 pages).
Maekawa, Y., et al., Near Fine Grain Parallel Processing of Circuit Simulation Using Direct Method, 1995, pp. 272-276 (5 pages).

* cited by examiner

*Primary Examiner* — Ryan Jarrett
(74) *Attorney, Agent, or Firm* — Osha • Liang LLP

(57) ABSTRACT

A method for a power grid configured to supply current to a plurality of elements of a circuit. The method includes representing the power grid as a graph including a plurality of nodes and a plurality of edges, wherein each node of a portion of the plurality of nodes corresponds to an element of the plurality of elements each modeled as a current source, determining a characteristic matrix A of the power grid, wherein transient behavior of the power grid is represented by a set of linear equations of $A*v=i$, wherein v is a nodal voltage vector representing nodal voltages of at least a portion of the plurality of nodes and i is a current source vector representing currents supplied to at least a portion of the plurality of elements, identifying first and second partitions of the power grid based on a predetermined criterion, identifying first and second current source subvectors of the current source vector according to the first and second partitions of the power grid, identifying a first shell of the first partition based on worst case nodal voltage sensitivity analysis with respect to the first current source subvector, identifying a second shell of the second partition based on worst case nodal voltage sensitivity analysis with respect to the second current source subvector, and generating an analysis result of transient behavior of the power grid by analyzing, concurrently and independently, the first and second shells of the first and second partitions of the power grid, respectively.

14 Claims, 5 Drawing Sheets

US 8,024,051 B2

PARALLEL POWER GRID ANALYSIS

BACKGROUND

In an integrated circuit, commonly referred to as a chip, electrical power is distributed to the components of the chip over a network of conductors on the chip. With the increasing chip design complexity and shrinking feature size, the design and analysis of on-chip power distribution network become an extremely challenging task, which demands both high computational efficiency and accuracy for analysis tools. For analysis purposes, power distribution network (or power grid) is typically represented by a large-scale linear system in which special purpose, time-domain circuit simulation techniques are applied to identify resistive voltage drop (i.e., IR drop), electromigration and noise failures. It is a difficult task to achieve reasonable tradeoff between accuracy and performance in performing simulation of the extremely large size, flat, irregular power grids used in microprocessor designs.

SUMMARY

In general, in one aspect, the invention relates to a method for a power grid configured to supply current to a plurality of elements of a circuit. The method includes representing the power grid as a graph comprising a plurality of nodes and a plurality of edges, wherein each node of a portion of the plurality of nodes corresponds to an element of the plurality of elements each modeled as a current source, determining a characteristic matrix A of the power grid, wherein transient behavior of the power grid is represented by a set of linear equations of $A*v=i$, wherein v is a nodal voltage vector representing nodal voltages of at least a portion of the plurality of nodes and i is a current source vector representing currents supplied to at least a portion of the plurality of elements, identifying first and second partitions of the power grid based on a pre-determined criterion, identifying first and second current source subvectors of the current source vector according to the first and second partitions of the power grid, identifying a first shell of the first partition based on worst case nodal voltage sensitivity analysis with respect to the first current source subvector, identifying a second shell of the second partition based on worst case nodal voltage sensitivity analysis with respect to the second current source subvector, and generating an analysis result of transient behavior of the power grid by analyzing, concurrently and independently, the first and second shells of the first and second partitions of the power grid, respectively.

In general, in one aspect, the invention relates to a computer-readable medium having instructions for analyzing a power grid supplying current to a plurality of elements of a circuit. The instructions when executed by a processor comprising functionality for representing the power grid as a graph comprising a plurality of nodes and a plurality of edges, wherein each node of a portion of the plurality of nodes corresponds to an element of the plurality of elements each modeled as a current source, determining a characteristic matrix A of the power grid, wherein transient behavior of the power grid is represented by a set of linear equations of $A*v=i$, wherein v is a nodal voltage vector representing nodal voltages of at least a portion of the plurality of nodes and i is a current source vector representing currents supplied to at least a portion of the plurality of elements, identifying first and second partitions of the power grid based on a pre-determined criterion, identifying first and second current source subvectors of the current source vector according to the first and second partitions of the power grid, identifying a first shell of the first partition based on worst case nodal voltage sensitivity analysis with respect to the first current source subvector, identifying a second shell of the second partition based on worst case nodal voltage sensitivity analysis with respect to the second current source subvector, and generating an analysis result of transient behavior of the power grid by analyzing, concurrently and independently, the first and second shells of the first and second partitions of the power grid, respectively.

Other aspects of the invention will be apparent from the following description and the appended claims.

DETAILED DESCRIPTION

Figure 1:
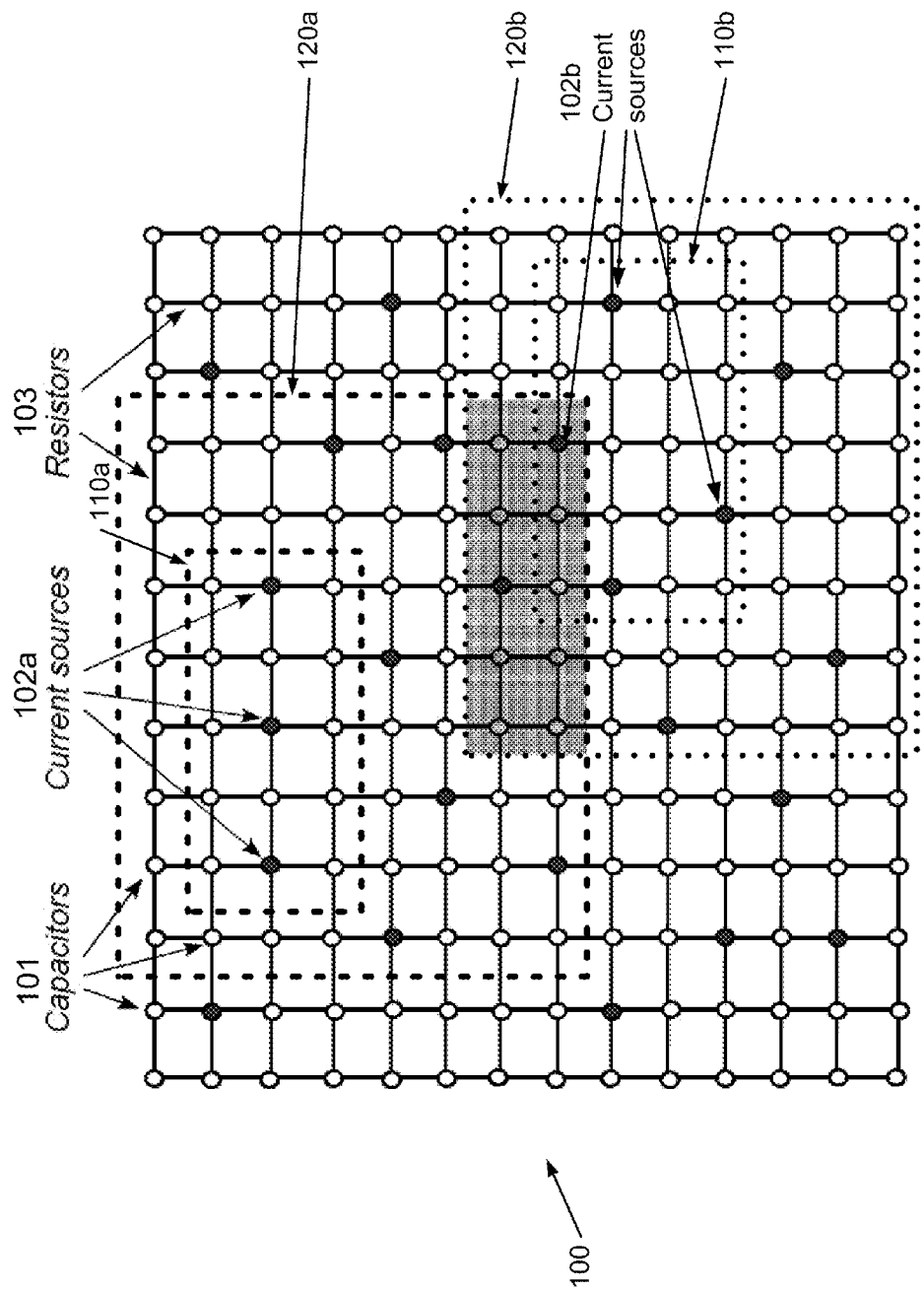
FIG. 1 shows a schematic block diagram of an example power grid in accordance with one or more embodiments of the invention.

Specific embodiments of the invention will now be described in detail with reference to the accompanying Figures. Like elements in the various Figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method to perform efficient circuit simulation for very large scale integrated circuit designs, such as power grid simulation for a high performance microprocessor. In one or more embodiments, the simulation employs power grid partitioning such that transient analysis for each partition at each simulation time step may be performed in parallel with multiple independent threads. In one or more embodiments, the power grid partitioning may be based on the sparse vector decomposition and current locality shell effect where worst case nodal sensitivity analysis is used to determine the size of the shell associated with each partition. In one or more embodiments, the simulation runtime performance is scalable with the number of parallel threads, while adequate accuracy may be maintained (e.g., within 0.5%).

In one or more embodiments, a power grid may be a part of a circuit (e.g., an integrated circuit) for supplying currents to various components in the circuit and may be represented as a graph inside a circuit simulation tool. The graph may include a collection of nodes interconnected with edges where the nodes may be associated with parasitic capacitors of the circuit and the edges may be associated with parasitic resistors of the circuit. In one or more embodiments, the parasitic capacitors and parasitic resistors may include contributions from the power grid and/or other portions of the circuit. In addition, certain nodes may be associated with current sources modeling elements of the circuit drawing currents from the power grid.

FIG. 1 shows a schematic block diagram of an example power grid (100) in accordance with one or more embodiments of the invention. In one or more embodiments of the invention, one or more of the elements or modules shown in FIG. 1 may be omitted, repeated, and/or substituted.

As shown in FIG. 1, power grid (100) includes a collection of nodes (e.g., 101, 102a, 102b) where each node is connected to neighboring nodes by edges (e.g., 103). For example, in the power grid (100), nodes (102a, 102b) are shown to be associated with current sources modeling elements of the circuit (not shown) drawing currents from the power grid (100). In addition, nodes (101) are shown to be associated with parasitic capacitors and edges (103) are shown to be associated with parasitic resistors. Further as shown in FIG. 1, unlabeled nodes depicted as open circles are associated with parasitic capacitors without current sources, while nodes depicted as solid circles are associated with both parasitic capacitors and current sources. Although not explicitly shown, the values of the parasitic capacitors, parasitic resistors, and current sources may vary from one node/edge to another.

In one or more embodiments of the invention, the power grid (100) may be represented in a design representation along with other portions of the circuit. For example, the power grid and associated parasitic capacitors, parasitic resistors, and current sources may be represented in a detailed standard parasitic format (DSPF) netlist of the circuit. Throughout this document, depending on the context, the term "power grid" may refer to the physical power distribution network in a circuit or a functional representation of the physical power distribution network (e.g., in the form of a graph, a netlist, or other formats used in design, manufacturing, or testing of the circuit).

In one or more embodiments of the invention, electrical parameters of the power grid (100) may be represented using a nodal voltage vector and a current source vector. For example, the nodal voltage vector may include vector components representing nodal voltages of the nodes. Similarly, the current source vector may include vector components representing current sources associated with the solid nodes in the power grid (100). Generally speaking, the dimension of the nodal voltage vector and the dimension of the current source vector are the same and equal the number of nodes in the power grid where vector components in the current source vector corresponding to nodes not associated with a current source is set to zero. However, in some embodiments, certain nodes or current sources may be omitted from the nodal voltage vector and the current source vector, the dimensions of the nodal voltage vector and the current source vector may differ, and the vector components in the nodal voltage vector and the current source vector may be arranged in different orders.

In one or more embodiments of the invention, electrical characteristics of the power grid (100) may be represented using a characteristic matrix A by which transient behavior of the power grid may be modeled as a system of linear equations in the form of $A*v=i$, where v is the nodal voltage vector and i is the current source vector. In one or more embodiments of the invention, the characteristic matrix A and right-hand-side vector i may be determined based on the values of the parasitic capacitors, parasitic resistors, and current sources included in the DSPF netlist of the circuit.

Further as shown in FIG. 1, a portion of the power grid (100) is enclosed in a partition (110a) including current sources (depicted as a solid circle) associated with nodes (102a). In addition, another portion of the power grid (100) is enclosed in a partition (110b) including current sources associated with a node (102b) among others. In one or more embodiments of the invention, transient analysis (e.g., timing simulation) for the power grid (100) may be performed in a multi-threaded computer (e.g., a multiprocessor, a multi-core processor, a distributed computing system with multiple computing nodes, a time-multiplexed multi-threaded processor, and/or other suitable computer platforms) where different threads executing in the multi-threaded computer perform the transient analysis for the different partitions (110a, 100b) concurrently and independently.

In one or more embodiments of the invention, the thread assigned to analyze the partition (110a) may include in its analysis nodes beyond the partition (110a) that forms a larger portion (120a) of the power grid (100) where influences from the current sources (102a) within the partition (110a) on the nodal voltages exceed a pre-determined threshold. This portion (120a) is referred to as a shell of the partition (110a). Similarly, the thread assigned to analyze the partition (110b) may include in its analysis nodes in a shell (120b) depending on how far reaching the influences of the current sources (e.g., 102b) within the partition (110b) may be. Further details of partitioning the power grid and determining the shell for the corresponding partition are described with respect to FIGS. 2 and 3 below.

In one or more embodiments of the invention, voltage parameters of the shell (120a) may be represented using a nodal voltage subvector, while current source parameters of the partition (110a) may be represented using a current source subvector. Specifically, the nodal voltage subvector of the shell (120a) may be a variation of the nodal voltage vector of the power grid (100) that includes only vector components corresponding to the nodes within the shell (120a) with other vector components in the nodal voltage vector set to zero. Similarly, the current source subvector of the partition (110a) may be a variation of the current source vector of the power grid (100) that includes only vector components corresponding to the current sources (102a) within the partition (110a) with other vector components in the current source vector set to zero. Generally speaking, the dimension of the nodal voltage subvector equals that of the nodal voltage vector, while the dimension of the current source subvector equals that of the current source vector. In some embodiments, the subvectors may have different dimensions than that of the corresponding vectors.

In one or more embodiments of the invention, a thread a in the multi-threaded computer assigned to analyze the partition (110a) may include in its analysis only current sources within the partition (110a) and their contributions to nodal voltages of all nodes in the shell (120a). Nodal voltage contributions to nodes in an overlapped shell region (depicted as the cross-hatched portion of (100)) from current sources within the shell (120a), but outside the partition (110a), such as the current source (102b), instead of being analyzed by the thread a, are analyzed by another thread b in the multi-threaded computer assigned to analyze the partition (110b). Nodal voltage contributions from currents sources (102a) analyzed by the thread a may then be summed at least with nodal voltage contributions from currents source (102b) analyzed by the thread b to generate an overall nodal voltage. Further details of analyzing the power grid using parallel computing are described with respect to FIGS. 2 and 3 below.

Although the example power grid (100) is shown in a rectangular format in FIG. 1, in general, other formats with alternative connectivity patterns may be used to form various graphs to model various power grids.

Figure 2:
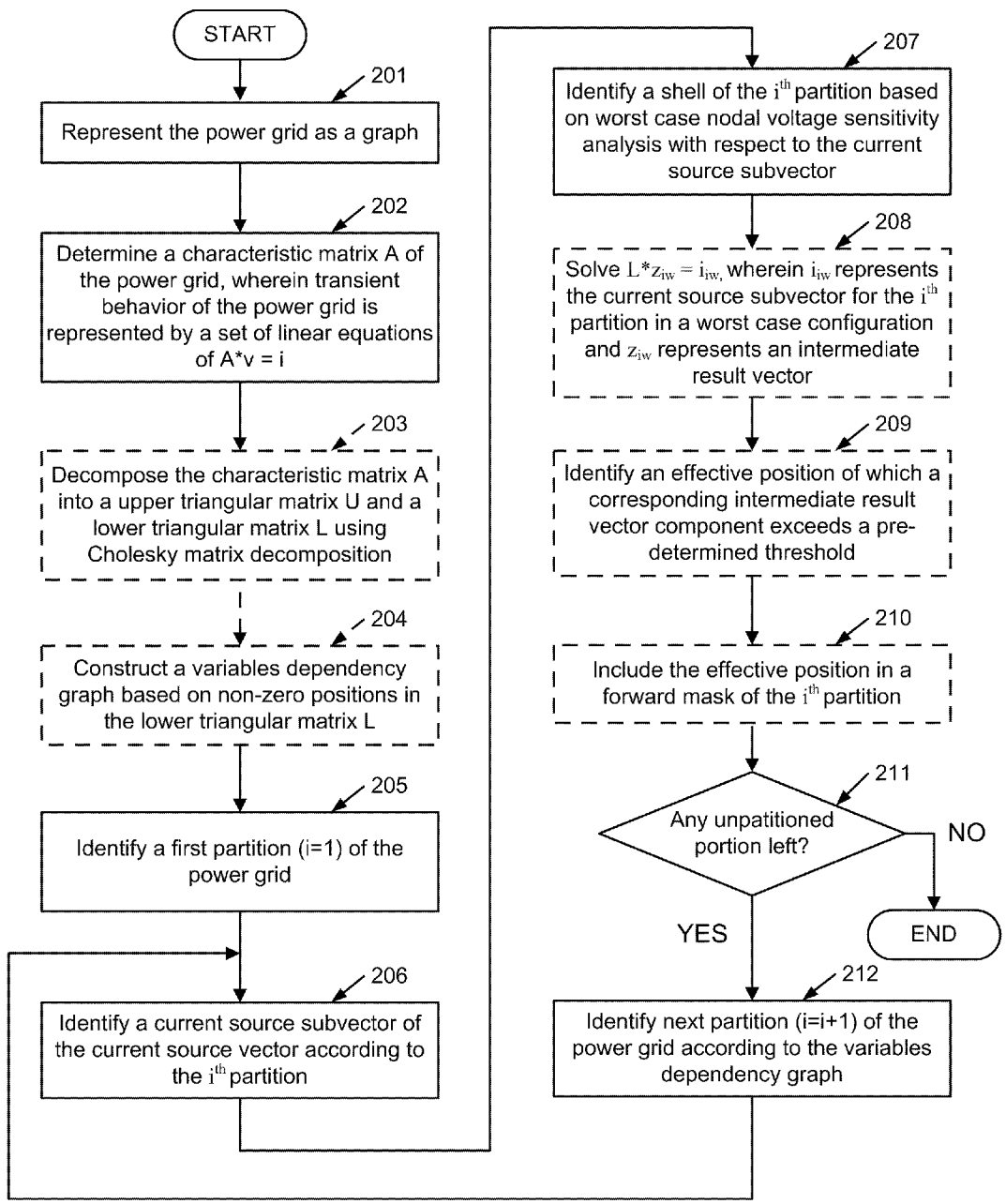
FIGS. 2 and 3 show flowcharts of a method in accordance with one or more embodiments of the invention.

FIG. 2 shows a flow chart of a method in accordance with one or more embodiments of the invention. In one or more embodiments of the invention, one or more of the elements shown in FIG. 2 may be omitted, repeated, and/or performed in a different order. Accordingly, embodiments of the invention should not be considered limited to the specific arrangements of elements shown in FIG. 2. In one or more embodiments of the invention, the method depicted in FIG. 2 may be practiced using system (500) described with respect to FIG. 5 below for performing analysis of the power grid (100) described with respect to FIG. 1 above.

In element 201, the power grid is represented as a graph. In one or more embodiments of the invention, values of parasitic capacitors and parasitic resistors associated with a circuit powered by the power grid may be assigned to nodes and edges of the graph. In one or more embodiments of the invention, the values of the parasitic capacitors, parasitic resistors, and current sources may be included in a design representation of the circuit, such as a DSPF netlist.

In element 202, a characteristic matrix A of the power grid is determined by which transient behavior of the power grid may be modeled as a system of linear equations in the form of $A*v=i$, where v is a nodal voltage vector representing nodal voltages of at least a portion of the nodes in the graph and i is a current source vector representing currents drawn by at least a portion of the elements of the circuit powered by the power grid. For example, each element of the nodal voltage vector v may represent nodal voltage of a node in the graph and each element of the current source vector i may represent current source associated with a node in the graph. In one or more embodiments of the invention, the characteristic matrix A may be determined based on the values of the parasitic capacitors and parasitic resistors included in the DSPF netlist of the circuit.

In element 203, the characteristic matrix A is decomposed into a upper triangular matrix U and a lower triangular matrix L such that $A=L*U$. One skilled in the art will recognize that the characteristic matrix A of a physical circuit is non-singular such that known decomposition techniques may be applied.

In element 204, a variables dependency graph is constructed based on non-zero positions in the lower triangular matrix L. In one or more embodiments of the invention, a symbolic representation of the lower triangular matrix L is used where specific values of the matrix elements are ignored while only the non-zero positions are retained in the symbolic representation. In one or more embodiments of the invention, the variables dependency graph may be constructed by mapping the non-zero positions to parent-child relationships in the graph. Mode details in the representing the lower triangular matrix L in symbolic representation and constructing the variables dependency graph may be found in the example described with respect to FIG. 4 below.

In element 205, a partition of the power grid may be identified, for example according to the variables dependency graph constructed in element 204 above. Mode details in identifying the power grid partition according to the variables dependency graph may be found in the example described with respect to FIG. 4 below. Although elements 203 through 205 describes a specific partition scheme, embodiments of the invention may identify one or more partitions of the power grid based on other pre-determined criterion.

In element 206, a current source subvector of the partition is identified. As described above with respect to FIG. 1, a subvector of a vector is a modified version of the vector having the same dimension as the vector, but only a portion of the non-zero vector element positions of the vector. In one or more embodiments of the invention, only those vector elements corresponding to current sources within the partition are retained in the current source subvector of the partition, while other vector elements in the current source vector of the power grid are set to zero.

In element 207, first shell of the partition is identified based on worst case nodal voltage sensitivity analysis with respect to the current source subvector. In one or more embodiments of the invention, the worst case nodal voltage sensitivity analysis identifies an effective node, from the graph and to be included in the shell, of which the nodal voltage sensitivity with respect to a worst case configuration of current sources in the current source subvector of the partition exceeds a pre-determined threshold. Specifically, the worst case nodal voltage sensitivities may be determined by solving $A*v_{1w}=i_{1w}$ to obtain $v_{1w}$, where $i_{1w}$ represents the current source subvector in a worst case configuration and $v_{1w}$ represents contributions from the worst case current source subvector to the nodal voltage vector. In one embodiment, the worst case configuration may be defined as when all current sources are turned on at the same time. In other embodiments, the worst case configuration may be defined differently based on circuit operation characteristics of the circuit and/or the power grid.

A specific scheme for solving $A*v_{1w}=i_{1w}$ to obtain $v_{1w}$ is described in the elements 208-210. In element 208, $A*v_{1w}=i_{1w}$ is rewritten as $L*U\,v_{1w}=i_{1w}$ based on the decomposition described in the element 202 so that $L*z_{1w}=i_{1w}$ is solved (referred to as forward substitution in a matrix solving operation of A) to obtain an intermediate result vector $z_{1w}$ for the worst case current source subvector.

In element 209, one or more effective positions may be identified from the vector element positions of the intermediate result vector $z_{1w}$ where the corresponding vector component exceeds a second pre-determined threshold, for example zero. In one or more embodiments of the invention, each non-zero positions in $i_{1w}$ may be normalized (i.e., set) to a constant, for example 1.

In element 210, all effective positions are included together in a forward mask of the partition. In one or more embodiments of the invention, the forward mask may be used in the transient analysis of the power grid to simplify the analysis of the partition. Furthermore, following the elements 208-210 using the rewritten equation $L*U\,v_{1w}=i_{1w}$, $U*v_{1w}=z_{1w}$ may be solved (referred to as backward substitution in the matrix solving operation of A) to obtain $v_{1w}$ as an example of the element 207 for solving $A*v_{1w}=i_{1w}$ to obtain $v_{1w}$.

In element 211, a decision is made as to whether there is any portion of the power grid that is not included in a partition. If the decision is yes, then the method proceeds to element 212 where next partition is identified according to the variables dependency graph, in the same manner as the element 205, before the method re-enters the iteration loop at the element 206. If the decision in the element 211 is no, then the method ends resulting in a set of partitions of the power grid with corresponding current subvectors and shells as well as optionally a set of corresponding forward masks, all or portions of which may be used in analyzing the power grid as described with respect to FIG. 3 below.

Figure 3:
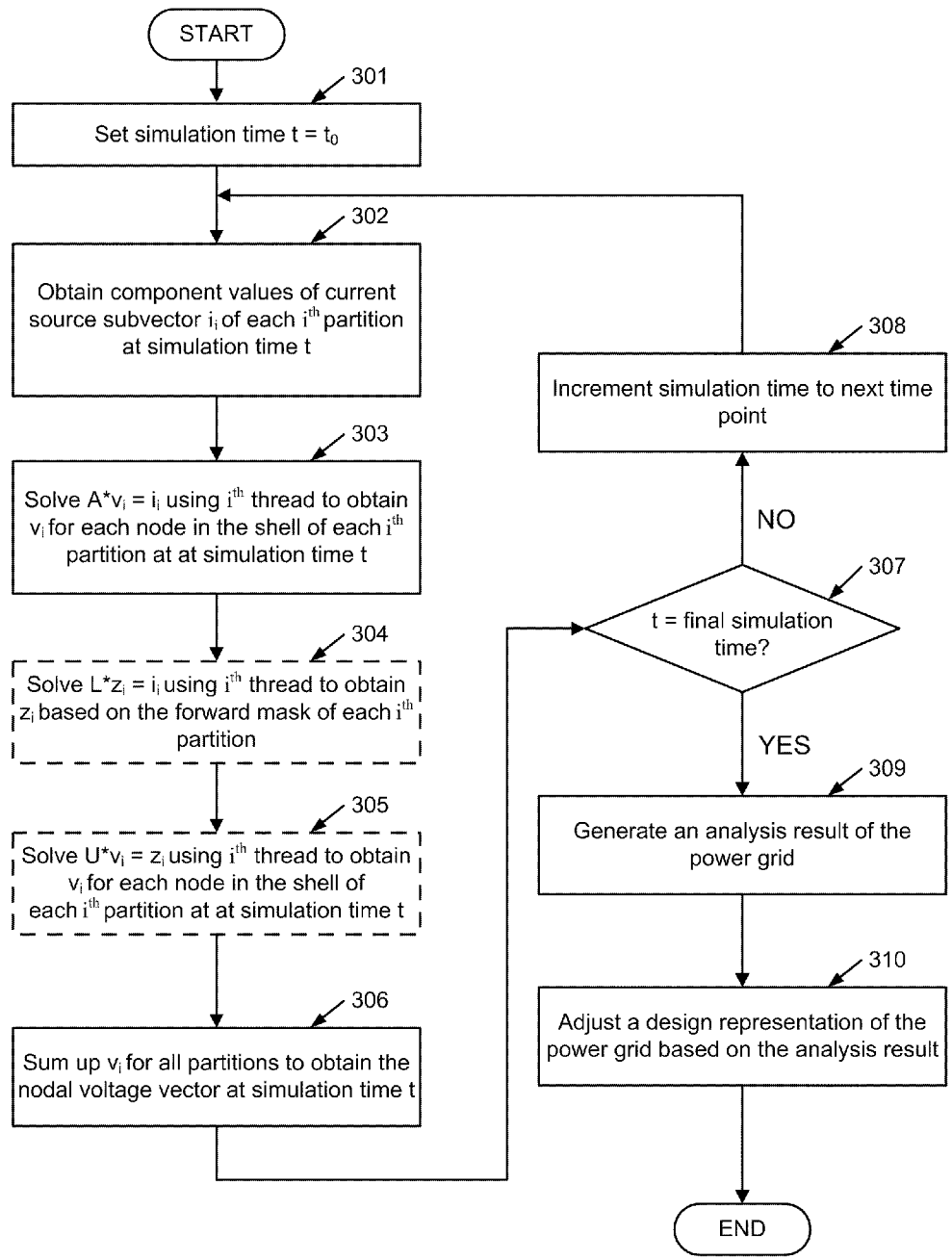

FIG. 3 shows a flow chart of a method in accordance with one or more embodiments of the invention. In one or more embodiments of the invention, one or more of the elements shown in FIG. 3 may be omitted, repeated, and/or performed in a different order. Accordingly, embodiments of the invention should not be considered limited to the specific arrangements of elements shown in FIG. 3. In one or more embodiments of the invention, the method depicted in FIG. 3 may be practiced using system (500) described with respect to FIG. 5 below for performing analysis of the power grid (100) described with respect to FIG. 1 above.

In element 301, simulation time t is set to a beginning time point $t_0$. For example, the simulation time may be set in a timing simulator or a transient analyzer used for analyzing the power grid.

In one or more embodiments of the invention, the simulation may be performed using a multi-threaded computer (e.g., a multiprocessor, a multi-core processor, a distributed computing system with multiple computing nodes, a time-multiplexed multi-threaded processor, and/or other suitable computer platforms) where different threads executing in the multi-threaded computer perform analysis for different partitions of the power grid concurrently and independently. Specifically, the simulation may involve obtaining current source vector i of the power grid as a function of time and solving the set of linear equations of $A*v=i$ to obtain the nodal voltage vector v as a function of time.

In one or more embodiments of the invention, at least a portion of the linear equations of $A*v=i$ is solved for a partition of the power grid based on the corresponding current source subvector and the shell using a thread of the multi-threaded computer to obtain the nodal voltage subvector of the partition, concurrently and independently of the execution of other thread analyzing other partitions of the power grid. In one or more embodiments of the invention, nodal voltage contributions from current source subvectors of different partitions to a node in an overlapping shell region of these partitions may be summed from analysis results generated from multiple threads.

In element 302, vector component values of current source subvector $i_i$ of $i^{th}$ partition of the power grid is obtained at simulation time t. Specifically, the vector component values represent current magnitudes of current sources within the $i^{th}$ partition. In one or more embodiments of the invention, vector component values of current source subvector $i_i$ at simulation time t may be extracted, according to the $i^{th}$ partition of the power grid (e.g., identified using the method described with respect to FIG. 2 above), from the time dependent current source vector of the power grid that is obtained as a given input of the simulation. In one or more embodiments of the invention, vector component values of current source subvector $i_i$ of each $i^{th}$ partition of the power grid is obtained as the analysis input for the $i^{th}$ thread of the multi-threaded computer. In one or more embodiments of the invention, element 302 is performed using one thread of the multi-threaded computer for each partition of the power grid in a concurrent manner. In one or more embodiments of the invention, element 302 is performed using one thread of the multi-threaded computer for each partition of the power grid without passing information among different threads such that analysis for each partition is performed independently.

In element 303, the linear equation $A*v_i=i_i$ is solved to obtain $v_i$ for each node in the $i^{th}$ shell (e.g., identified using the method described with respect to FIG. 2 above) at simulation time t, where $v_i$ represents contributions from the current source subvector $i_i$ to the nodal voltage vector v of the power grid. In one or more embodiments of the invention, element 303 is performed using one thread of the multi-threaded computer for each partition of the power grid in a concurrent manner. In one or more embodiments of the invention, element 302 is performed using one thread of the multi-threaded computer for each partition of the power grid without passing information among different threads such that analysis for each partition is performed independently.

A specific scheme for solving the linear equation $A*v_i=i_i$ is described in the elements 304-305. In element 304, the linear equation $A*v_i=i_i$ is rewritten as $L*U$ $v_i=i_i$ such that $v_i$ is obtained by first solving $L*z_i=i_i$ (i.e., performing forward substitution in the matrix solving operation of A) to obtain an intermediate result vector $z_i$ at simulation time t. In one or more embodiments of the invention, the $i^{th}$ forward mask may be applied to mask a portion of $z_i$, corresponding to the zero positions of the $i^{th}$ forward mask, in solving $L*z_i=i_i$ to simplify the computation task. In one or more embodiments of the invention, element 304 is performed using one thread of the multi-threaded computer for each partition of the power grid.

In element 305, the linear equation $U*v_i=z_i$ is solved (referred to as backward substitution in the matrix solving operation of A) to obtain $v_i$ at simulation time t. In one or more embodiments of the invention, element 305 is performed using one thread of the multi-threaded computer for each partition of the power grid in a concurrent manner. In one or more embodiments of the invention, element 302 is performed using one thread of the multi-threaded computer for each partition of the power grid without passing information among different threads such that analysis for each partition is performed independently.

In element 306, vector components of each nodal voltage subvector $v_i$ are summed up to generate the nodal voltage vector of the power grid. As described with respect to FIG. 1 above, an overlapping shell region may exist between different partitions, of which corresponding nodal voltage subvectors share non-zero vector component positions, such that nodal voltage of certain node in the overlapping shell region may receive contributions from analysis results generated by multiple threads.

In element 307, a decision is made as to whether the final simulation time is reached. If the decision is no, then the method proceeds to element 308, where the simulation time t is incremented to the next simulation time point before the method re-enters the iteration loop at the element 302. If the decision in the element 307 is yes, then the method ends resulting in an analysis result of nodal voltages for each node of the power grid as a function of time (element 309) based on which the design of the power gird may be adjusted (element 310), for example, by adjusting a design representation of the power gird such as the DSPF netlist.

Figure 4A:
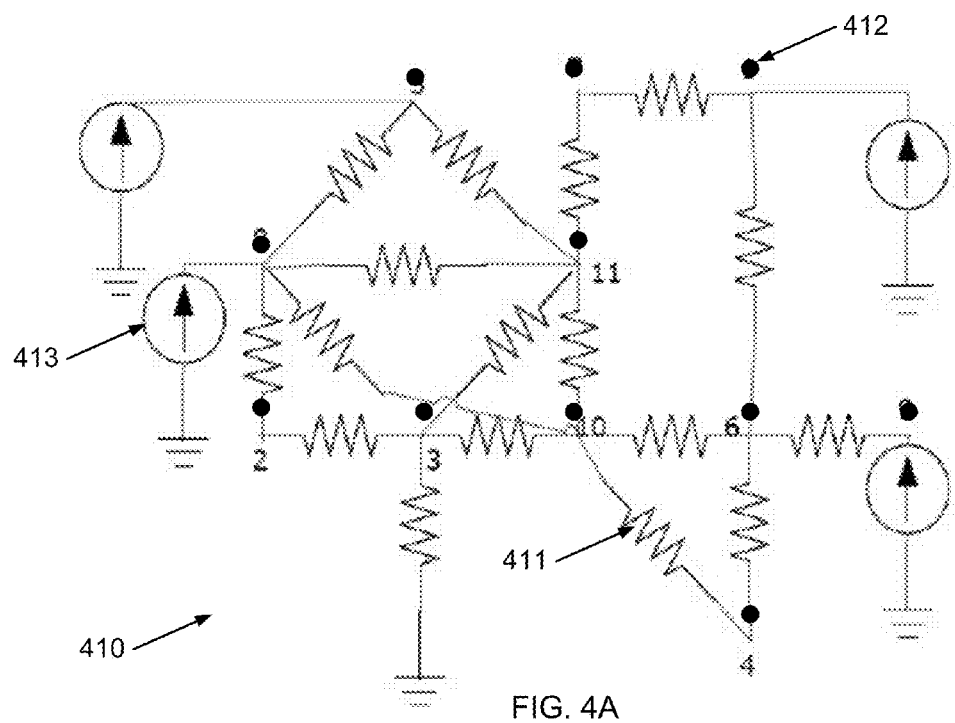
FIGS. 4A and 4B show an example application in accordance with one or more embodiments of the invention.
Figure 4B:
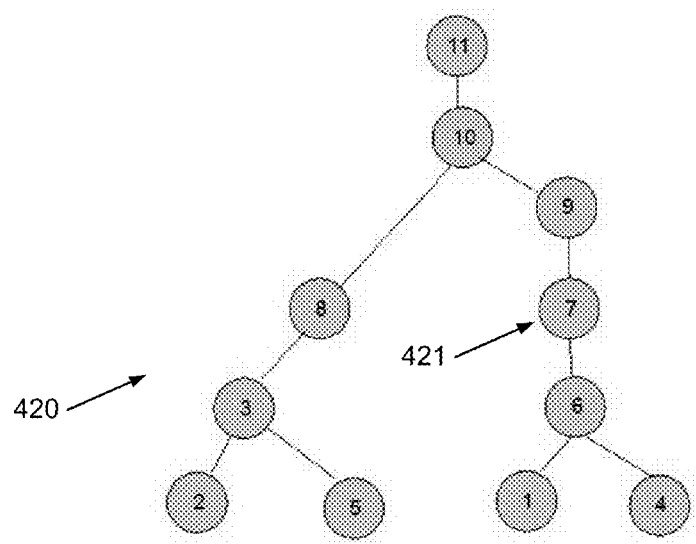

FIGS. 4A and 4B show an example application in accordance with one or more embodiments of the invention. As shown in FIG. 4A, a power grid (410) is represented as a graph including a set of numbered nodes (e.g., 412) labeled from 1 through 11 connected via a set of edges each depicted as a resistor (e.g., 411). In addition, nodes 1, 5, 8, and 9 are shown to be associated with current sources (e.g., 413).

Based on the example power grid configuration described above, the nodal voltage vector v may be represented as [$v_1$, $v_2$, ... $v_{11}$] or in a transposed format while the current source vector i may be represented as [$i_1$, 0, 0, 0, $i_5$, 0, 0, $i_8$, $i_9$, 0, 0] or in a transposed format. In addition, the characteristic matrix A may be determined as below in TABLE 1, if the resistors shown in FIG. 4A are assumed to be 1 ohm each.

TABLE 1

$$A = \begin{pmatrix} 2 & 0 & 0 & 0 & 0 & -1 & -1 & 0 & 0 & 0 & 0 \\ 0 & 2 & -1 & 0 & 0 & 0 & 0 & -1 & 0 & 0 & 0 \\ 0 & -1 & 4 & 0 & 0 & 0 & 0 & 0 & 0 & -1 & -1 \\ 0 & 0 & 0 & 2 & 0 & -1 & 0 & 0 & 0 & -1 & 0 \\ 0 & 0 & 0 & 0 & 2 & 0 & 0 & -1 & 0 & 0 & -1 \\ -1 & 0 & 0 & -1 & 0 & 4 & 0 & 0 & -1 & -1 & 0 \\ -1 & 0 & 0 & 0 & 0 & 0 & 2 & 0 & 0 & 0 & -1 \\ 0 & -1 & 0 & 0 & -1 & 0 & 0 & 4 & 0 & -1 & -1 \\ 0 & 0 & 0 & 0 & 0 & -1 & 0 & 0 & 1 & 0 & 0 \\ 0 & 0 & -1 & -1 & 0 & -1 & 0 & -1 & 0 & 5 & -1 \\ 0 & 0 & -1 & 0 & -1 & 0 & -1 & -1 & 0 & -1 & 5 \end{pmatrix}$$

In TABLE 1, the non-zero positions are determined based on resistor connectivity pattern defined in FIG. 4A. Those skilled in the art will recognize that the characteristic matrix A as defined here allows the power grid (410) to be analyzed using the set of linear equations of A*v=i and that the matrix A is non-singular such that will matrix decomposition techniques may apply in inverting the characteristic matrix A for solving the nodal voltage vector v based on a given time dependent current source vector i.

Using matrix decomposition, the lower triangular matrix L may be determined as below in TABLE 2.

TABLE 2

$$L = \begin{pmatrix} 1.4142 & 0 & 0 & 0 & 0 & 0 & 0 & 0 & 0 & 0 & 0 & 0 & 0 \\ 0 & 1.4142 & 0 & 0 & 0 & 0 & 0 & 0 & 0 & 0 & 0 & 0 & 0 \\ 0 & -0.7071 & 1.8708 & 0 & 0 & 0 & 0 & 0 & 0 & 0 & 0 & 0 & 0 \\ 0 & 0 & 0 & 1.4142 & 0 & 0 & 0 & 0 & 0 & 0 & 0 & 0 & 0 \\ 0 & 0 & 0 & 0 & 1.4142 & 0 & 0 & 0 & 0 & 0 & 0 & 0 & 0 \\ -0.7071 & 0 & 0 & -0.7071 & 0 & 1.7321 & 0 & 0 & 0 & 0 & 0 & 0 & 0 \\ -0.7071 & 0 & 0 & 0 & -0.2887 & 1.1902 & 0 & 0 & 0 & 0 & 0 & 0 & 0 \\ 0 & -0.7071 & -0.2673 & 0 & -0.7071 & 0 & 0 & 1.7113 & 0 & 0 & 0 & 0 & 0 \\ 0 & 0 & 0 & 0 & 0 & -0.5774 & -0.14 & 0 & 0 & 0 & 0.8044 & 0 & 0 \\ 0 & 0 & -0.5345 & -0.7071 & 0 & -0.8660 & -0.2100 & -0.6678 & -0.6581 & 1.5941 & 0 & 0 & 0 \\ 0 & 0 & -0.5345 & 0 & -0.7071 & 0 & -0.8402 & -0.96 & 0 & 0 & -0.1463 & -1.3798 & 0.8133 \end{pmatrix}$$

Accordingly, the symbolic representation of the characteristic matrix A and the lower triangular matrix L may be represented below in TABLE 3 and TABLE 4 with diagonal elements numbered corresponding to the nodes, non-zero positions denoted with x, and other positions unmarked. In the example here, the format of which specific values of the parasitic capacitor/resistor and current sources are omitted is referred to as the symbolic representation of the matrix (e.g., the characteristic matrix A, the upper triangular matrix U, or the lower triangular matrix L)

TABLE 3

$$\begin{pmatrix} 1 & & & & & X & X & & & & \\ & 2 & X & & & & & X & & & \\ & X & 3 & & & & & & & X & X \\ & & & 4 & & X & & & & X & \\ & & & & 5 & & & X & & & X \\ X & & & X & & 6 & & & X & X & \\ X & & & & & & 7 & & & & X \\ & X & & & X & & & 8 & & X & X \\ & & & & & X & & & 9 & & \\ & & X & X & & X & & X & & 10 & X \\ & & X & & X & & X & X & & X & 11 \end{pmatrix}$$

TABLE 4

$$\begin{pmatrix} 1 & & & & & & & & & & \\ & 2 & & & & & & & & & \\ X & & 3 & & & & & & & & \\ & & & 4 & & & & & & & \\ & & & & 5 & & & & & & \\ X & & X & & & 6 & & & & & \\ X & & & & & X & 7 & & & & \\ & X & X & & X & & & 8 & & & \\ & & & & & & & X & X & 9 & \\ & X & X & & & X & X & X & X & & 10 \\ & & X & & X & & & X & X & X & 11 \end{pmatrix}$$

FIG. 4b shows a variables dependency graph (420) obtained from the lower triangular matrix L above. As shown in FIG. 4B, the variables dependency graph (420) includes numbered circles (e.g., 421) labeled from 1 through 11 corresponding to the numbered nodes of the power grid (410). In one or more embodiments of the invention, the leading x in each column of the lower triangular matrix L is used to define parent-child relationships in the variables dependency graph. For example, the leading x in column one is at the position of [column 1, row 6] therefore node 6 is defined as the parent to node 1 in the variables dependency graph (420).

Generally speaking, the variables dependency graph may be partitioned using various known schemes such as to minimize interconnection among partitions, to maximize size balances among partitions, etc. For example, partition 1 may be identified to include nodes 1, 4, 6, 7, and 8 while partition 2 may be identified to include nodes 2, 5, 3, 8, 10, and 11. In one or more embodiments of the invention, the current source subvector $i_1$ may be represented as $[i_1, 0, 0, 0, 0, 0, 0, 0, i_9, 0, 0]$ or in a transposed format. Similarly, the current source subvector $i_2$ may be represented as $[0, 0, 0, 0, i_5, 0, 0, i_8, 0, 0, 0]$ or in a transposed format. In one or more embodiments of the invention, the worst case configuration of the current source subvector $i_{1w}$ may be defined as $[1, 0, 0, 0, 0, 0, 0, 0, 1, 0, 0]$ indicating both current sources are turned on at the same time while the worst case configuration of the current source subvector $i_{2w}$ may be defined as $[0, 0, 0, 0, 1, 0, 0, 1, 0, 0, 0]$ indicating a similar configuration. As described above with respect to FIG. 2 above, the worst case configuration may be defined differently based on circuit operation characteristics of the circuit and/or the power grid in other examples.

TABLE 5 below shows $i_{1w}$ and $i_{2w}$ in the vertical column format.

TABLE 5

$$i_{1w} = \begin{pmatrix} 1 \\ 0 \\ 0 \\ 0 \\ 0 \\ 0 \\ 0 \\ 0 \\ 1 \\ 0 \\ 0 \end{pmatrix} \quad i_{2w} = \begin{pmatrix} 0 \\ 0 \\ 0 \\ 0 \\ 1 \\ 0 \\ 0 \\ 1 \\ 0 \\ 0 \\ 0 \end{pmatrix}$$

Using the method described with respect to FIG. 3 above, the example power grid (410) may be analyzed and the results are shown in TABLE 6 and TABLE 7 below.

TABLE 6

$$z_{1w} = \begin{pmatrix} 0.7071 \\ 0 \\ 0 \\ 0 \\ 0 \\ 0.2887 \\ 0.4901 \\ 0 \\ 1.5357 \\ 0.8554 \\ 2.2338 \end{pmatrix} \quad z_{2w} = \begin{pmatrix} 0 \\ 0 \\ 0 \\ 0 \\ 0.7071 \\ 0 \\ 0 \\ 0.8765 \\ 0 \\ 0.3672 \\ 2.2725 \end{pmatrix}$$

TABLE 6 shows the worst case intermediate result vectors $z_{w1}$ and $z_{2w}$. Based on the method described with respect to FIG. 3 above, forward masks may be defined according to non-zero positions in the worst case intermediate result vectors $z_{w1}$ and $z_{2w}$. For example, the forward mask for partition 1 may be defined as [1, 0, 0, 0, 0, 1, 1, 0, 1, 1, 1] while the forward mask for partition 2 may be defined as [0, 0, 0, 0, 1, 0, 0, 1, 0, 1, 1]. Alternatively, the forward mask may be defined by comparing vector components in the worst case intermediate result vectors $z_{w1}$ and $z_{2w}$ to a threshold, for example 0.4, in which case the forward mask for partition 1 may be defined as [1, 0, 0, 0, 0, 0, 1, 0, 1, 1, 1] while the forward mask for partition 2 may be defined as [0, 0, 0, 0, 1, 0, 0, 1, 0, 0, 1]. As described with respect to FIG. 3 above, these forward masks may be used to simplify the computing task by ignoring the zero positions in the intermediate result vector z in solving the equation L*z=i for each simulation time point in each of the thread 1 and thread 2, which are assigned to analyze partition 1 and partition 2, respectively, in a multi-threaded computer.

TABLE 7

$$v_{1w} = \begin{pmatrix} 4.1108 \\ 2.3391 \\ 2.0000 \\ 3.3536 \\ 2.7124 \\ 3.7929 \\ 3.4288 \\ 2.6781 \\ 4.7929 \\ 2.9142 \\ 2.7467 \end{pmatrix} \quad v_{2w} = \begin{pmatrix} 2.7150 \\ 2.5567 \\ 2.0000 \\ 2.6623 \\ 3.4538 \\ 2.6755 \\ 2.7546 \\ 3.1135 \\ 2.6755 \\ 2.6491 \\ 2.7942 \end{pmatrix}$$

TABLE 7 shows the worst case nodal voltage subvectors $v_{1w}$ and $v_{2w}$. The worst case nodal voltage vector $v_w$ may then be determined by summing $v_{1w}$ and $v_{2w}$. Based on the method described with respect to FIG. 3 above, the shells may be defined for partition 1 and partition 2 based on the worst case nodal voltage sensitivities reflected in these worst case nodal voltage subvector $v_{1w}$ and $v_{2w}$. In this example, the nodal voltage sensitivities of a node with respect to current sources in $i^{th}$ partition (i=1 or 2 in this example) may be defined as a ratio of the nodal voltage of the node (i.e., as a vector component value) in the nodal voltage subvector $v_{iw}$ over the nodal voltage of the node in the nodal voltage vector $v_w$.

TABLE 8 shows the vector component values of $v_{1w}$, $v_{2w}$, $v_w$, and the worst case nodal voltage sensitivities with respect to partition 1 and partition 2.

TABLE 8

| worst case nodal voltage subvector for partition 1 $v_{1w}$ | worst case nodal voltage subvector for partition 1 $v_{2w}$ | worst case nodal voltage vector for power grid power grid | worst case nodal voltage sensitivities with respect to partition 1 $v_{1w}/(v_{1w} + v_{2w})$ | worst case nodal voltage sensitivities with respect to partition 2 $v_{2w}/(v_{1w} + v_{2w})$ |
|---|---|---|---|---|
| 4.1108 | 2.7150 | 6.8258 | 60% | 40% |
| 2.3391 | 2.5567 | 4.8958 | 48% | 52% |
| 2.0000 | 2.0000 | 4.0000 | 50% | 50% |
| 3.3536 | 2.6623 | 6.0159 | 56% | 44% |
| 2.7124 | 3.4538 | 6.1662 | 44% | 56% |
| 3.7929 | 2.6755 | 6.4684 | 59% | 41% |
| 3.4288 | 2.7546 | 6.1834 | 55% | 45% |
| 2.6781 | 3.1135 | 5.7916 | 46% | 54% |
| 4.7929 | 2.6755 | 7.4684 | 64% | 36% |
| 2.9142 | 2.6491 | 5.5633 | 52% | 48% |
| 2.7467 | 2.7942 | 5.5409 | 50% | 50% |

In a nominal case, the threshold for determining the effective nodes may be set around 5%, in which case the shell for both partition 1 and partition 2 will include all nodes in the power grid (410) as the worst case nodal voltage sensitivity of each node 1 through 11 with respect to either partition 1 or partition 2 exceeds 5% in TABLE 8. For illustration purposes, if the threshold is set to be 45%, then the shell of partition 1 may be defined as [1, 1, 1, 1, 0, 1, 1, 1, 1, 1, 1] (i.e., nodes 1-4 and 6-11 in the power grid (410)) while the shell of partition 2 may be defined as [0, 1, 1, 0, 1, 0, 1, 1, 0, 1, 1] (i.e., nodes 2-3, 5, 7-8, and 10-11 in the power grid (410)). In other examples, the worst case voltage sensitivities may be define in other manner to reflect the influence to the nodal voltage of a node by current sources within any one partition of the power grid.

Generally speaking, the influences on nodal voltage from a current source decreases substantially as the distance between the node and the current source increases. This effect is referred to as the current locality effect. Those skilled in the art, with the benefit of the description above, will recognize that in a large scale power grid (e.g., more than hundreds times larger than the example power grid (410)) the shell of a partition will be much sparser than the example shells of the power grid (410) described above due to the current locality effect. Said in other words, the number of nodes in the shell is typically a small fraction of the total number of nodes in a large scale power grid. Therefore, the run time for analyzing the large scale power grid may be substantially reduced by performing the analysis in a concurrent and independent manner using multiple threads in a multi-threaded computer with each thread performing analysis of nodes in a sparse shell.

Figure 5:
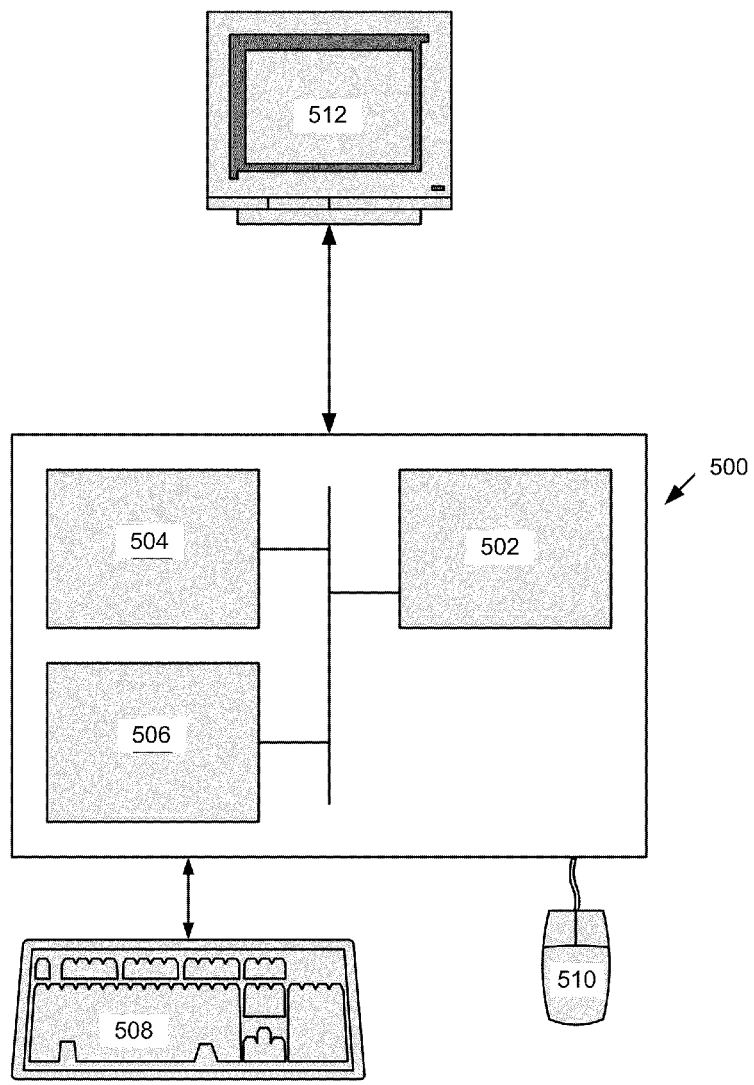
FIG. 5 shows a schematic block diagram of a computer system using which one or more embodiments of the invention may be implemented.

Embodiments of the invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) ) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of computing nodes, where each portion of the invention may be located on a different computing node within the distributed system. In one embodiment of the invention, the computing node corresponds to a computer system. Alternatively, the computing node may correspond to a processor with associated physical memory. The computing node may alternatively correspond to a processor with shared memory and/or resources. Further, software instructions for performing embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for a power grid configured to supply current to a plurality of elements of a circuit, comprising:

representing the power grid as a graph comprising a plurality of nodes and a plurality of edges, wherein each node of a portion of the plurality of nodes corresponds to an element of the plurality of elements each modeled as a current source;

determining a characteristic matrix A of the power grid, wherein transient behavior of the power grid is represented by a set of linear equations of A*v=i, wherein v is a nodal voltage vector representing nodal voltages of at least a portion of the plurality of nodes and i is a current source vector representing currents supplied to at least a portion of the plurality of elements;

identifying first and second partitions of the power grid based on a pre-determined criterion;

identifying first and second current source subvectors of the current source vector according to the first and second partitions of the power grid;

identifying a first shell of the first partition based on worst case nodal voltage sensitivity analysis with respect to the first current source subvector;

identifying a second shell of the second partition based on worst case nodal voltage sensitivity analysis with respect to the second current source subvector; and generating an analysis result of transient behavior of the power grid by analyzing, concurrently and independently, the first and second shells of the first and second partitions of the power grid, respectively.

2. The method of claim 1, wherein analyzing transient behavior of the power grid is performed for a plurality of time points in a simulation.

3. The method of claim 1, further comprising adjusting a design representation of the power grid based on the analysis result.

4. The method of claim 1,
wherein each node of the plurality of nodes is associated with a parasitic capacitor of the circuit and each edge of the plurality of edges is associated with a parasitic resistor of the circuit, and
wherein determining the characteristic matrix A of the circuit is according to a netlist representing the circuit, wherein the parasitic capacitor and the parasitic resistor are represented in the netlist.

5. The method of claim 4, wherein the netlist comprises a detailed standard parasitic format (DSPF) netlist.

6. The method of claim 1, wherein identifying the first shell of the first partition based on worst case nodal voltage sensitivity analysis with respect to the first current source subvector comprises:
identifying an effective node of the plurality of nodes of which the nodal voltage sensitivity with respect to a worst case configuration of current sources in the first current source subvector exceeds a pre-determined threshold, and
including the effective node in the first shell.

7. The method of claim 1, wherein analyzing transient behavior of the power grid comprises:
obtaining the current source vector i as a first function of time;
solving the set of linear equations of $A*v=i$ to obtain the nodal voltage vector v as a second function of time.

8. The method of claim 1, wherein analyzing the first shell comprises:
obtaining the current source vector i as a first function of time, and
solving at least a portion of the set of linear equations of $A*v=i$ to obtain a nodal voltage subvector of the nodal voltage vector corresponding to the first shell as a second function of time.

9. The method of claim 1,
wherein identifying the first shell of the first partition based on worst case nodal voltage sensitivity analysis with respect to the first current source subvector comprises:
solving $A*v_{1w}=i_{1w}$ to obtain $v_{1w}$, wherein $i_{1w}$ represents the first current source subvector in a worst case configuration and $v_{1w}$ represents contributions from the first current source subvector in the worst case configuration to the nodal voltage vector;
identifying an effective node, from the plurality of nodes, of which a corresponding component in $v_{1w}$ exceeds a first pre-determined threshold, wherein each non-zero positions in $i_{1w}$ is normalized to a constant; and
including the effective node in the first shell, and
wherein analyzing the first shell comprises:
obtaining the first current source subvector as a first function of time;
solving $A*v_1=i_1$ to obtain $v_1$ for each node in the first shell as a second function of time, wherein $i_1$ represents the first current source subvector and $v_1$ represents contributions from the first current source subvector to the nodal voltage vector.

10. The method of claim 9, wherein identifying first and second partitions of the power grid based on a pre-determined criterion comprises:
decomposing the characteristic matrix A into a upper triangular matrix U and a lower triangular matrix L such that $A=L*U$;
constructing a variables dependency graph based on non-zero positions in the lower triangular matrix L; and
identifying first and second partitions of the power grid according to the variables dependency graph.

11. The method of claim 10,
wherein solving $A*v_{1w}=i_{1w}$ to obtain $v_{1w}$ comprises:
solving $L*z_{1w}=i_{1w}$ to obtain an intermediate result vector $z_{1w}$, for the worst case configuration of the first current source subvector, comprising a plurality of intermediate result vector components corresponding to a plurality of positions;
identifying an effective position, from the plurality of positions, of which a corresponding intermediate result vector component exceeds a second pre-determined threshold,
including the effective position in a forward mask of the first partition, and
solving $U*v_{1w}=z_{1w}$ to obtain $v_{1w}$, and
wherein solving $A*v_1=i_1$ to obtain $v_1$ for each node in the first shell as a second function of time comprises:
solving $L*z_1=i_1$ to obtain $z_1$ based on the first forward mask, wherein $i_1$ represents the first current source subvector and $z_1$ represents the intermediate result vector; and
solving $U*v_1=z_1$ to obtain $v_1$.

12. The method of claim 11, wherein solving $L*z_1=i_1$ is by using a first thread of a multi-threaded computer, wherein analyzing the second shell is performed by using a second thread of the multi-threaded computer.

13. The method of claim 11, wherein solving $U*v_1=z_1$ is by using a first thread of a multi-threaded computer, wherein analyzing the second shell is by performed using a second thread of the multi-threaded computer.

14. A non-transitory computer-readable medium having instructions for analyzing a power grid supplying current to a plurality of elements of a circuit, the instructions when executed by a processor comprising functionality for:
representing the power grid as a graph comprising a plurality of nodes and a plurality of edges, wherein each node of a portion of the plurality of nodes corresponds to an element of the plurality of elements each modeled as a current source;
determining a characteristic matrix A of the power grid, wherein transient behavior of the power grid is represented by a set of linear equations of $A*v=i$, wherein v is a nodal voltage vector representing nodal voltages of at least a portion of the plurality of nodes and i is a current source vector representing currents supplied to at least a portion of the plurality of elements;
identifying first and second partitions of the power grid based on a pre-determined criterion;
identifying first and second current source subvectors of the current source vector according to the first and second partitions of the power grid;

identifying a first shell of the first partition based on worst case nodal voltage sensitivity analysis with respect to the first current source subvector;
identifying a second shell of the second partition based on worst case nodal voltage sensitivity analysis with respect to the second current source subvector; and generating an analysis result of transient behavior of the power grid by analyzing, concurrently and independently, the first and second shells of the first and second partitions of the power grid, respectively.

* * * * *